US012525683B2

(12) United States Patent
Boddakayala et al.

(10) Patent No.: US 12,525,683 B2
(45) Date of Patent: Jan. 13, 2026

(54) FILTERING ASSEMBLY FOR BATTERY ARRAY OF A TRACTION BATTERY AND FILTERING METHOD

(71) Applicant: Ford Global Technologies, LLC, Dearborn, MI (US)

(72) Inventors: Bhaskara Rao Boddakayala, Troy, MI (US); Brian Utley, Canton, MI (US); Scott M. Rollins, Highland, MI (US); Liam E. West, Ferndale, MI (US); Parikshit Gupte, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 17/742,459

(22) Filed: May 12, 2022

(65) Prior Publication Data

US 2023/0369718 A1 Nov. 16, 2023

(51) Int. Cl.
*H01M 50/30* (2021.01)
*H01M 50/249* (2021.01)
*H01M 50/367* (2021.01)

(52) U.S. Cl.
CPC ....... *H01M 50/394* (2021.01); *H01M 50/249* (2021.01); *H01M 50/367* (2021.01); *H01M 2200/20* (2013.01)

(58) Field of Classification Search
None
See application file for complete search history.

(56) References Cited

U.S. PATENT DOCUMENTS

| 3,904,441 | A | * | 9/1975 | Badger | H01M 50/394 429/86 |
| 4,529,673 | A | * | 7/1985 | Zupancic | H01M 50/342 429/82 |
| 10,044,077 | B2 | | 8/2018 | Callahan et al. | |
| 11,201,364 | B2 | | 12/2021 | Kawakami et al. | |
| 2002/0094473 | A1 | * | 7/2002 | Lin | H01M 50/394 429/86 |
| 2016/0372726 | A1 | * | 12/2016 | Baldwin | H01M 50/308 |
| 2021/0260850 | A1 | | 8/2021 | Jin et al. | |
| 2021/0288379 | A1 | | 9/2021 | Meredith et al. | |
| 2021/0408575 | A1 | * | 12/2021 | Lampe-Onnerud | H01M 4/5825 |
| 2023/0163407 | A1 | * | 5/2023 | Huntsman | H01M 50/3425 429/53 |

OTHER PUBLICATIONS

Kramer: "Mesh Size", Kramer Industries Inc., <https://www.kramerindustriesonline.com/resources/mesh-size/> (Year: 2019).*

(Continued)

*Primary Examiner* — Matthew T Martin
*Assistant Examiner* — Jessie Walls-Murray
(74) *Attorney, Agent, or Firm* — David B. Kelley; Carlson, Gaskey & Olds, P.C.

(57) ABSTRACT

A traction battery assembly includes an array housing that houses battery cells, and a filter layer permitting a flow of gas vented from at least one of the battery cells to an area outside the array housing. The filter layer blocks a flow of particulates vented from the at least one battery cell to the area outside the array housing.

20 Claims, 4 Drawing Sheets

(56) References Cited

OTHER PUBLICATIONS

Donaldson, "Dual-Stage Vents for Automotive Battery Packs", Donaldson Filtration Solutions, Aug. 3, 2021, <https://www.donaldson.com/en-US/venting/products/battery/> and <https://www.youtube.com/watch?v=r2dUqV_oDjk> (Year: 2021).*
UniPipes ("Insert Molding—All You Need to Know", Nov. 1, 2019, <https://www.unipipes.com/blog/insert-molding-design>). (Year: 2019).*
Palmetto ("What is Polypropylene Fabric: Uses & Properties of PP Material", Palmetto Industries, Jan. 20, 2020, <https://www.palmetto-industries.com/polypropylene-fabric-the-superior-fabric/>) (Year: 2020).*
Layer | definition in the Cambridge English Dictionary, <https://dictionary.cambridge.org/us/dictionary/english/layer>, accessed: (Year: 2024).*

* cited by examiner

FILTERING ASSEMBLY FOR BATTERY ARRAY OF A TRACTION BATTERY AND FILTERING METHOD

TECHNICAL FIELD

This disclosure relates generally to venting battery cells of a battery array and, more particularly, to filtering particulates during the venting.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

SUMMARY

In some aspects, the techniques described herein relate to a traction battery assembly, including: an array housing that houses a plurality of battery cells; and a filter layer permitting a flow of gas vented from at least one battery cell within the plurality of battery cells to an area outside the array housing, the filter layer blocking a flow of particulates vented from the at least one battery cell within the plurality of battery cells to the area outside the array housing.

In some aspects, the techniques described herein relate to a traction battery assembly, further including a multilayer structure having the filter layer and at least one support layer, the at least one support layer providing at least one support layer venting passage that is configured to communicate the gas vented from the at least one battery cell.

In some aspects, the techniques described herein relate to a traction battery assembly, wherein the at least one support layer venting passage is configured to communicate the gas and the particulates to the filter layer.

In some aspects, the techniques described herein relate to a traction battery assembly, wherein the at least one support layer includes an inner support layer and an outer support layer that sandwich the filter layer.

In some aspects, the techniques described herein relate to a traction battery assembly, wherein the inner support layer provides at least one support layer venting passage that is configured to communicate the gas and the particulates to the filter layer, wherein the outer support layer provides at least one support layer venting passage that is configured to communicated the gas from the filter layer.

In some aspects, the techniques described herein relate to a traction battery assembly, wherein the outer support layer is a film layer configured to rupture to provide the at least one support layer venting passage in the outer support layer.

In some aspects, the techniques described herein relate to a traction battery assembly, wherein the array housing includes at least one array housing venting passage, wherein the at least one support layer venting passage in the outer support layer is configured to communicate the gas to the at least one array housing venting passage.

In some aspects, the techniques described herein relate to a traction battery assembly, wherein the multilayer structure is insert-molded with a portion of the array housing.

In some aspects, the techniques described herein relate to a traction battery assembly, wherein the array housing includes an array lid having at least one housing venting passage, the multilayer structure situated between the array lid and the plurality of battery cells.

In some aspects, the techniques described herein relate to a traction battery assembly, wherein the array housing is a metal or metal alloy.

In some aspects, the techniques described herein relate to a traction battery assembly, wherein the filter layer is a fibrous material.

In some aspects, the techniques described herein relate to a traction battery assembly, wherein the filter layer is a woven material.

In some aspects, the techniques described herein relate to a traction battery assembly, wherein the filter layer includes basalt.

In some aspects, the techniques described herein relate to a traction battery assembly, wherein the plurality of battery cells are pouch cells.

In some aspects, the techniques described herein relate to a traction battery assembly, wherein the filter layer is a steel mesh.

In some aspects, the techniques described herein relate to a traction battery assembly, wherein the array housing is a first array housing, and the plurality of battery cells is a first plurality of battery cells, and further including a battery pack enclosure housing the first plurality of battery cells and a plurality of second array housings each housing a respective second plurality of battery cells.

In some aspects, the techniques described herein relate to a method of venting a plurality of battery cells, including: communicating gas vented from at least one battery cell from an interior of an array housing, through a filter layer, to an exterior of the array housing; and capturing particulates vented from the at least one battery cell with the filter layer.

In some aspects, the techniques described herein relate to a method, wherein supporting the filter layer with at least one support layer of a multilayer structure having the filter layer.

In some aspects, the techniques described herein relate to a method, further including insert molding the multilayer structure with a portion of the array housing.

In some aspects, the techniques described herein relate to a method, wherein the filter layer is sandwiched between an inner support layer and an outer support layer of a multilayer structure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details assemblies and methods that help to vent arrays of a battery pack.

Figure 1:
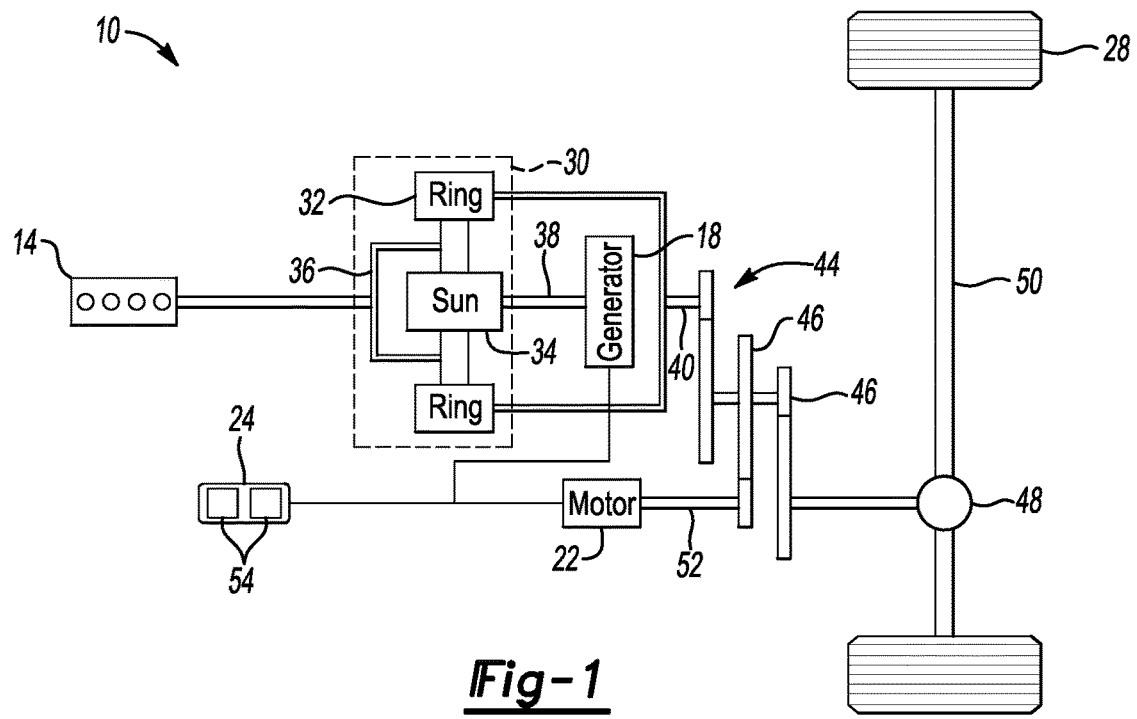
FIG. 1 illustrates a highly schematic view of a powertrain for an electrified vehicle.
Figure 2:
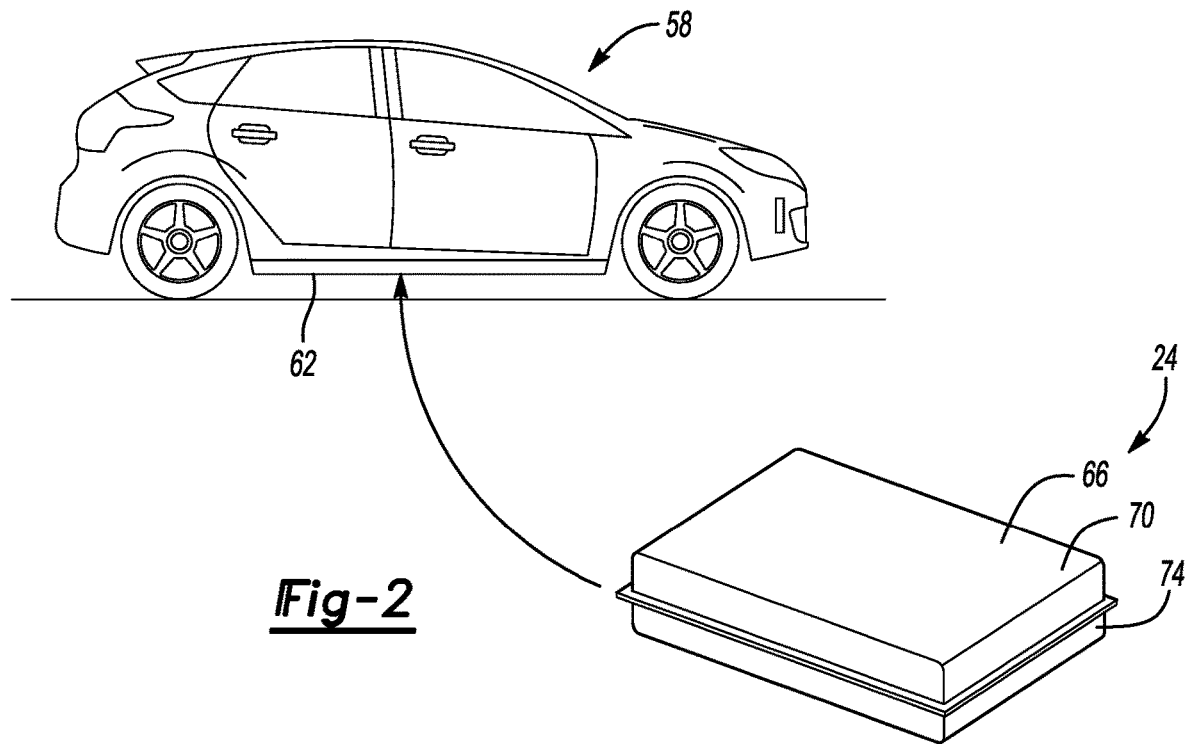
FIG. 2 illustrates how a battery pack of the powertrain of FIG. 1 can be positioned within the electrified vehicle according to an exemplary aspect of the present disclosure.
Figure 3:
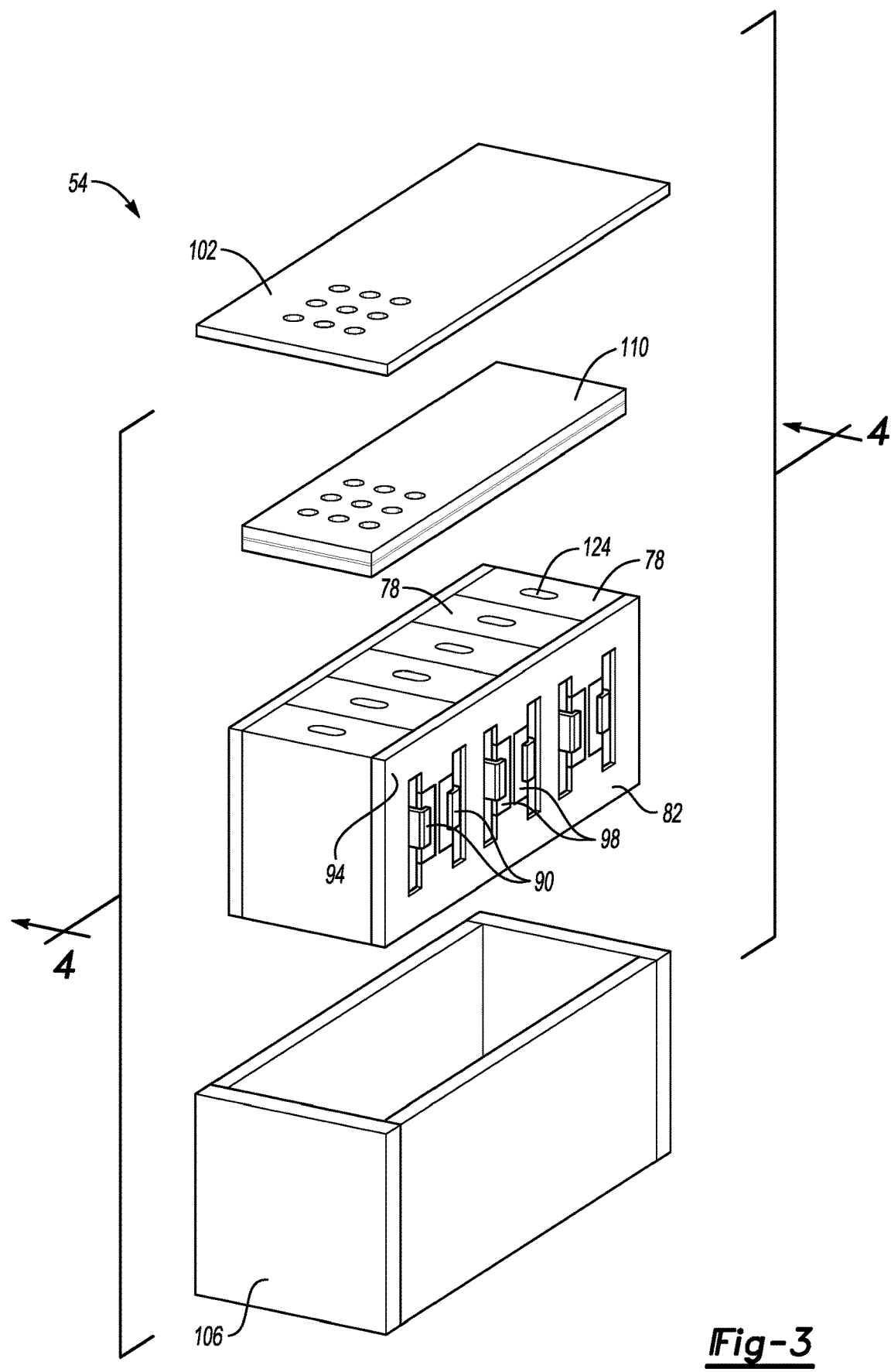
FIG. 3 illustrates an expanded view of an array from the battery pack of FIG. 2 according to an exemplary aspect of the present disclosure.
Figure 4:
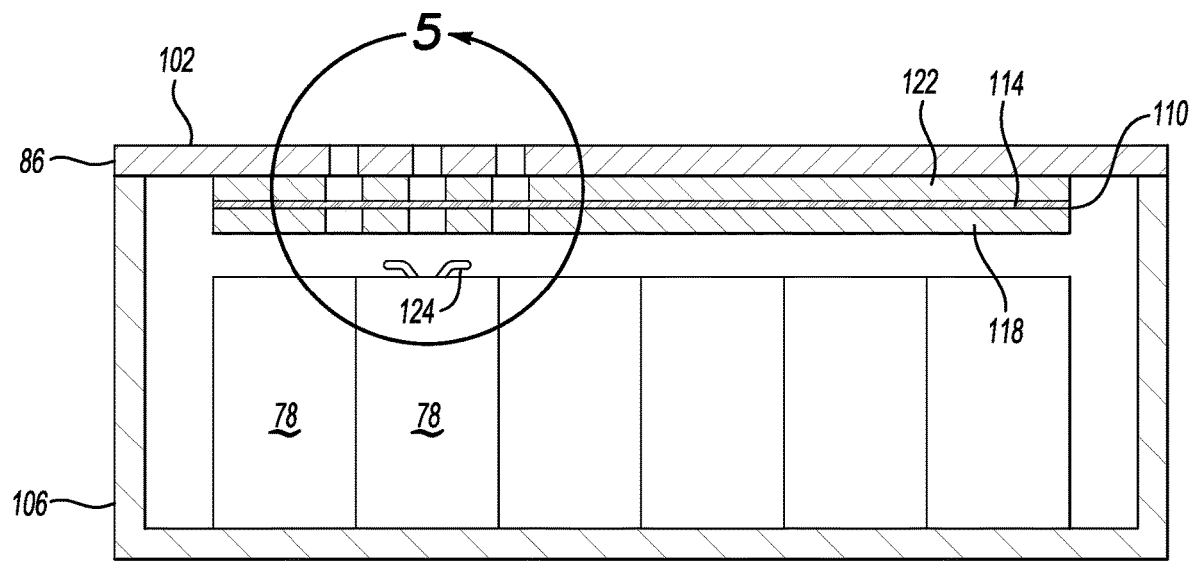
FIG. 4 illustrates a section view at line 4-4 in FIG. 3 when the array is within an enclosure of the battery pack.
Figure 5:
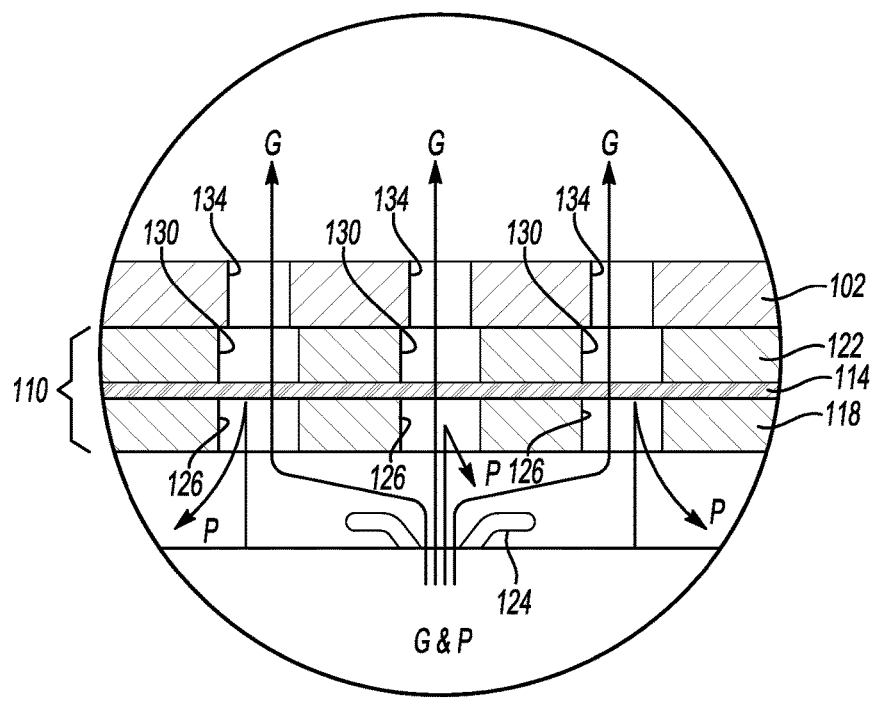
FIG. 5 illustrates a close-up view of an area of FIG. 4.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles (FCVs), and battery electrified vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle.

The engine 14, which is an internal combustion engine in this example, and the generator 18 may be connected through a power transfer unit 30. In one non-limiting embodiment, the power transfer unit 30 is a planetary gear set that includes a ring gear 32, a sun gear 34, and a carrier assembly 36. Of course, other types of power transfer units, including other gear sets and transmissions, may be used to connect the engine 14 to the generator 18.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electrified vehicle battery assembly. The battery pack 24 may have the form of a high-voltage battery that is capable of outputting electrical power to operate the motor 22 and the generator 18. The battery pack 24 is a traction battery pack as the battery pack 24 can provides power to propel the vehicle drive wheels 28. The battery pack 24 includes a plurality of battery arrays 54.

With reference to FIG. 2-5, the battery pack 24 can be secured to an electrified vehicle 58 and, in particular, to an underside 62 of the electrified vehicle 58. The battery pack 24, in this example, includes two battery arrays 54 held within an interior area provided by an enclosure 66. In other examples, the battery pack 24 could include more than two battery arrays, or a single battery array, within the enclosure 66. In a specific example, twelve arrays are held within the enclosure.

The example enclosure 66 includes a cover 70 and a tray 74. The cover 70 and tray 74 can be polymer-based. Alternatively, the cover 70, the tray 74, or both can be a metal or metal alloy.

Each of the battery arrays 54 can include a plurality of battery cells 78 and busbar frame assemblies 82 held within an array housing 86. The battery cells 78 can be pouch cells having tabs 90. The busbar frame assemblies 82 are disposed along opposing sides of the battery cells 78. The busbar frame assemblies 82 include a frame housing 94 holding a plurality of busbars 98 that are electrically coupled to the tabs 90.

The frame housing 94 can be a polymer-based material that can withstand temperatures of up to 1000 degrees Celsius. A resin of the polymer-based material can have additives to facilitate withstanding high temperatures. The additives could include, for example, 1 to 1.5 percent by weight intumescent material and 1 to 2 percent endothermic fillers of Aluminum Trihydrate, Sodium Silicate, etc.

The example array housing 86 includes an array lid 102 and an array tray 106. The array lid 102 and the array tray 106 can be a metal or metal alloy material. The array lid 102 can be secured to the array tray 106 using mechanical fasteners, for example.

In this example, the array housing 86 houses a multilayer structure 110 along with the plurality of battery cells 78. The multilayer structure 110 allows gas to vent from inside the array housing 86 to an area outside the array housing 86 within the interior of the enclosure 66. The gas can vent while the multilayer structures filters particulates so that the particulates do not flow outside the array housing 86 and create undesired electrical paths.

In particular, the multilayer structure 110 in the exemplary embodiment includes a filter layer 114 sandwiched between, and supported by, an inner support layer 118 and an outer support layer 122. In another example, one of the inner support layer 118 or the outer support layer 122 is omitted and the filter layer 114 supported by only one of the inner support layer 118 or the outer support layer 122.

From time to time, a thermal propagation event due to, for example, an overcharge or discharge, may increase pressure and temperature in one of the battery cells 78. Thermal propagation events could also be due to internal contamination, battery cell deformation, or electrical shorts.

Increased pressure and temperature can cause the vent 124 in that battery cell 78 to open. Gas and particulates are discharged from an interior of the battery cell 78 through the vent 124 into an interior of the array housing 86. This increases pressure and temperature within the interior of the array housing 86. Some battery cells 78, such as pouch cells, may not include a discrete vent, but could open in various areas due to a thermal propagation event.

The filter layer 114 can be a porous filter or fibrous layer that permits a flow of gas G vented from the battery cell 78 to an area outside the array housing 86. The filter layer 114 blocks a flow of particulates P (e.g., effluent particles) vented from the battery cell 78. Confining the particulates P to the interior of the array housing 86 keeps the particulates from causing undesired electrical connections within the enclosure 66 and outside of the array housing 86.

In an example, the filter layer 114 is a fibrous material. In another example, the filter layer 114 is basalt, which can withstand exposure to temperatures of 700-800 degrees Celsius for up to five minutes and 1000 degrees Celsius for shorter durations. The filter layer 114 can be woven or non-woven.

The inner support layer 118 and the outer support layer 122, in the exemplary embodiment, support the filter layer 114. The material for the inner support layer 118 and the outer support layer 122 can be non-electrically conductive and stiff enough to retain the filter layer 114 in position. The material for the inner support layer 118 and the outer support layer 122 could include, but are not limited to, plastics or metals. The inner support layer 118 and the outer support layer 122 can be a polymer-based material. The inner support layer 118 and the outer support layer 122 could be mica, for example.

To communicate gas G to the filter layer 114, the inner support layer 118 includes at least one inner support layer venting passage 126. To communicate gas G from the filter layer 114, the outer support layer 122 includes at least one outer support layer venting passage 130. The particulates P expelled from the battery cell 78 also move through the at least one inner support layer venting passage 126, but are blocked by the filter layer 114.

From the at least one outer support layer venting passage 130, the gas G moves through at least one array housing venting passage 134 from the battery array 54 into the interior of the enclosure 66. The at least one array housing venting passage 134 can be bored or otherwise machined into the outer support layer 122.

In this example, the outer support layer 122 is molded to include the at least one outer support layer venting passage 130. In another example, the outer support layer 122 could be a film layer that is ruptured by gas G that has moved through the filter layer 114. The ruptured areas provide the at least one outer support layer venting passage 130.

The multilayer structure 110 is in this example, vertically atop the battery cells 78 and situated between the battery cells 78 and the array lid 102. Vertical, for purposes of this disclosure, is with reference to ground and an ordinary orientation of the battery pack 24 during operation.

The multilayer structure 110 can be insert-molded with the array lid 102 to secure the multilayer structure 110 relative to the array lid 102. In another example, the multilayer structure 110 can be insert-molded with another portion of the array housing 86, such as the array tray 106.

A method of venting one of the battery cells 78 of the exemplary battery array 54 includes communicating gas G vented from the one of the battery cells 78 to an interior of the array housing 86. The gas G passes through the filter layer 114 and then to an exterior of the array housing 86. The filter layer 114 can capture particulates vented from the one of the battery cells 78 to prevent those particulates from moving into the interior of the array housing 86 outside of the array housing 86.

Figure 6:
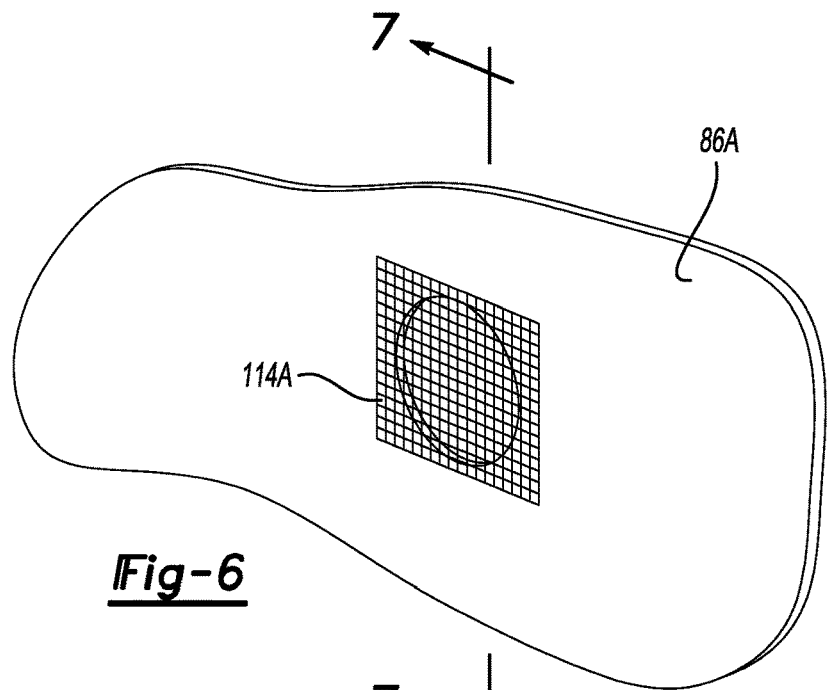
FIG. 6 illustrates a perspective view of a portion of an array housing venting passage and filter layer according to another exemplary embodiment of the present disclosure.
Figure 7:
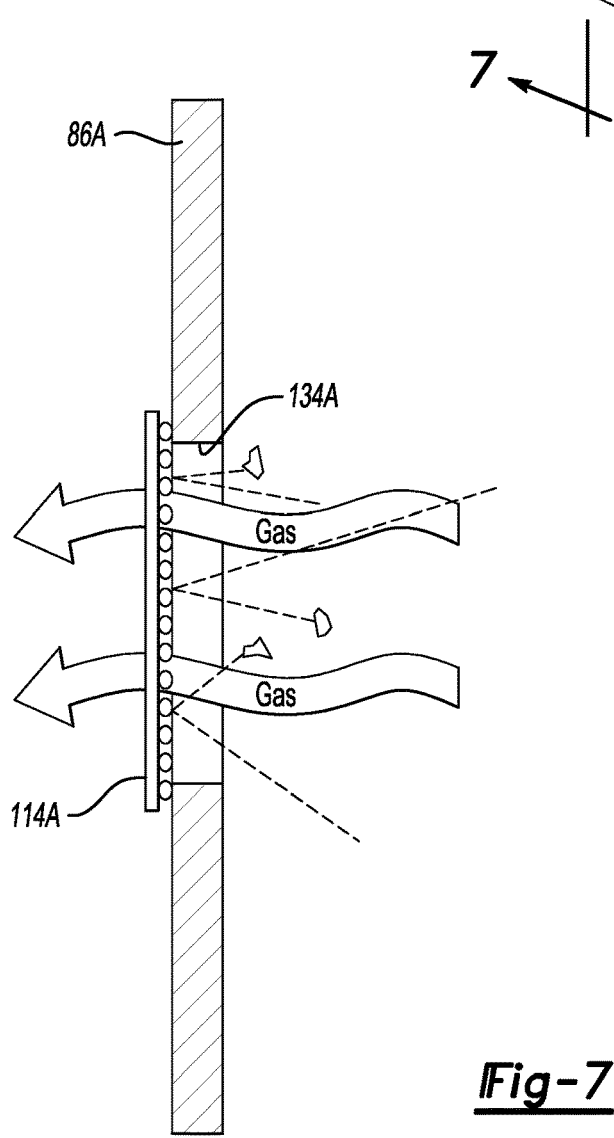
FIG. 7 illustrates a section view at line 7-7 in FIG. 6.

With reference now to FIGS. 6 and 7, another example array housing 86A includes an array housing venting passage 134A. A filter layer 114A covers the array housing venting passage 134A. The filter layer 114A is on an exterior surface of the array housing 86A in this example. In another example, the filter layer 114A is on an interior surface.

The filter layer 114A permits a flow of gas G vented from a battery cell within the array housing 86A to an area outside the array housing 86A. The filter layer 114A blocks a flow of particulates P (e.g., effluent particles) vented from the battery cell within the array housing 86A.

The filter layer 114A is a steel mesh, such as a grade 60 steel mesh screen. Other mesh densities can be employed to optimize performance. The steel mesh can provide a heat sink for the gas G vented through the filter layer 114A.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A traction battery assembly, comprising:
an array housing that houses a plurality of battery cells; and
a filter layer permitting a flow of gas vented from at least one battery cell within the plurality of battery cells to an area outside the array housing, the filter layer blocking a flow of particulates vented from the at least one battery cell within the plurality of battery cells to the area outside the array housing; and
a multilayer structure having the filter layer and at least one support layer, the at least one support layer providing at least one support layer venting passage that is configured to communicate the gas vented from the at least one battery cell, the multilayer structure situated between the array housing and the plurality of battery cells.

2. The traction battery assembly of claim 1, wherein the at least one support layer venting passage is configured to communicate the gas and the particulates to the filter layer.

3. The traction battery assembly of claim 1, wherein the at least one support layer comprises an inner support layer and an outer support layer that sandwich the filter layer.

4. The traction battery assembly of claim 3, wherein the inner support layer provides at least one support layer venting passage that is configured to communicate the gas and the particulates to the filter layer, wherein the outer support layer provides at least one support layer venting passage that is configured to communicate the gas from the filter layer.

5. The traction battery assembly of claim 4, wherein the outer support layer is a film layer configured to rupture to provide the at least one support layer venting passage in the outer support layer.

6. The traction battery assembly of claim 3, wherein the array housing includes at least one array housing venting passage, wherein the at least one support layer venting passage in the outer support layer is configured to communicate the gas to the at least one array housing venting passage.

7. The traction battery assembly of claim 1, wherein the multilayer structure is insert-molded with a portion of the array housing.

8. The traction battery assembly of claim 1, wherein the array housing includes an array lid having at least one housing venting passage, the multilayer structure situated between the array lid and the plurality of battery cells.

9. The traction battery assembly of claim 1, wherein the array housing is a metal or metal alloy.

10. The traction battery assembly of claim 1, wherein the filter layer is a fibrous material.

11. The traction battery assembly of claim 1, wherein the filter layer is a woven material.

12. The traction battery assembly of claim 1, wherein the filter layer comprises basalt with endothermic fillers.

13. The traction battery assembly of claim 1, wherein the plurality of battery cells are pouch cells.

14. The traction battery assembly of claim 1, wherein the filter layer is a steel mesh.

15. The traction battery assembly of claim 1, wherein the array housing is a first array housing, and the plurality of battery cells is a first plurality of battery cells, and further comprising a battery pack enclosure housing the first plurality of battery cells and a plurality of second array housings each housing a respective second plurality of battery cells.

16. The traction battery assembly of claim 1, wherein the filter layer is spaced a distance from the array housing.

17. The traction battery assembly of claim 1, wherein the array housing provides an interior area that houses the plurality of battery cells, the multilayer structure disposed within the interior area.

18. The traction battery assembly of claim 17, wherein the array housing includes at least one array housing venting passage that communicates the flow of gas from the interior area to the area outside the array housing.

19. A traction battery assembly, comprising:

an array housing providing an interior area that houses a plurality of battery cells, the array housing including at least one array housing venting passage that communicates a flow of gas from the interior area to an area that is outside the array housing, the flow of gas vented from at least one battery cell within the plurality of battery cells; and a filter layer within the interior area and outside of the at least one array housing venting passage, the filter layer permitting the flow of gas vented from at least one battery cell within the plurality of battery cells to the at least one array housing venting passage, the filter layer blocking a flow of particulates vented from the at least one battery cell within the plurality of battery cells to the at least one array housing venting passage.

20. The traction battery assembly of claim 19, further comprising a multilayer structure having the filter layer sandwiched between an outer support layer and an inner support layer, the outer support layer providing at least one support layer venting passage that is configured to communicate the gas vented from the at least one battery cell from the multilayer structure to the at least one array housing venting passage.

* * * * *